United States Patent
Scott et al.

(10) Patent No.: US 10,450,090 B1
(45) Date of Patent: Oct. 22, 2019

(54) PLURAL FUNCTION AIRPLANE NOSE GEAR TOW HOOK

(71) Applicant: JBT Lektro, Inc., Warrenton, OR (US)

(72) Inventors: Jeremiah Scott, Astoria, OR (US); Kai Ojala, Astoria, OR (US); Robert A. Zschoche, Bend, OR (US)

(73) Assignee: JBT Lektro, Inc., Warrenton, OR (US)

( * ) Notice: Subject to any disclaimer, the term of this patent is extended or adjusted under 35 U.S.C. 154(b) by 0 days.

(21) Appl. No.: 15/942,319

(22) Filed: Mar. 30, 2018

Related U.S. Application Data (60) Provisional application No. 62/500,253, filed on May 2, 2017.

(51) Int. Cl.
*B64F 1/22* (2006.01)
*B60D 1/04* (2006.01)

(52) U.S. Cl.
CPC . *B64F 1/22* (2013.01); *B60D 1/04* (2013.01)

(58) Field of Classification Search
CPC ... B64F 1/22; B64F 1/224; B60D 1/04; B66C 1/14; B66C 1/34; B65G 7/12; F16G 17/00
USPC ............... 294/15, 82.1, 82.11, 82.14; 278/96
See application file for complete search history.

(56) References Cited

U.S. PATENT DOCUMENTS

| | | | |
|---|---|---|---|
| 1,675,681 A * | 7/1928 | Wiese | F16B 45/00 278/96 |
| 1,963,634 A * | 6/1934 | Stahl | B66C 1/14 24/116 R |
| 2,878,640 A * | 3/1959 | Fritz | F16G 17/00 24/116 R |
| 3,181,893 A | 5/1965 | Jopson et al. | |
| 3,233,933 A * | 2/1966 | Coski | B66C 1/34 24/116 R |
| 3,333,412 A * | 8/1967 | Werner | B66C 1/36 294/82.17 |
| 3,729,926 A * | 5/1973 | Buske | F16G 17/00 294/82.1 |
| 3,955,832 A | 5/1976 | Kalmanson | |
| 4,167,108 A * | 9/1979 | Jarman | B21D 1/12 24/369 |
| 4,883,280 A | 11/1989 | Christian | |
| 5,151,003 A | 9/1992 | Zschoche | |
| 5,967,541 A | 10/1999 | Johansen | |
| 6,450,756 B1 | 9/2002 | Stahacyk et al. | |

(Continued)

FOREIGN PATENT DOCUMENTS

| | | | | |
|---|---|---|---|---|
| CA | 2894088 | | 12/2016 | |
| EP | 1300360 A1 * | | 4/2003 | ............. B66C 1/125 |

OTHER PUBLICATIONS

General Aviation FTD (Flat Tire Dolly) Tobar—AERO Specialties specification sheet; May 5, 2017; 2 pages.

(Continued)

*Primary Examiner* — Dean J Kramer
(74) *Attorney, Agent, or Firm* — Christensen O'Connor Johnson Kindness PLLC (57) ABSTRACT

A plural function tow hook is described for engaging airplane nose gears having nose gears of different styles. Consequently, a single tow hook can be used in multiple applications for aircraft towing purposes. The tow hook receives and engages a pin of a nose gear for use in towing the aircraft in one application. The tow hook receives first and second loops of a tow strap passing around a strut of an airplane nose gear in another application.

19 Claims, 6 Drawing Sheets

(56) References Cited

U.S. PATENT DOCUMENTS

| | | |
|---|---|---|
| 6,543,790 B2 | 4/2003 | Johnson |
| 7,234,665 B2 | 6/2007 | MacGregor et al. |
| 8,235,152 B2 | 8/2012 | Kastan |
| 8,950,775 B2 | 2/2015 | Moore |
| 9,108,477 B2 | 8/2015 | Lelij |
| 2012/0193928 A1* | 8/2012 | Schiedegger ............ B64F 1/22 294/82.1 |
| 2013/0001967 A1* | 1/2013 | Root ................... B60P 7/0823 294/82.1 |
| 2015/0259077 A1 | 9/2015 | Wiskus |

OTHER PUBLICATIONS

717 Tug MGTOW 15,500lbs; Red Box Aviation specification sheet; May 5, 2017; 2 pages.
Machine translation of European Patent No. EP 1 300 360 (A1), issued Apr. 9, 2003; 13 pages.

* cited by examiner

PLURAL FUNCTION AIRPLANE NOSE GEAR TOW HOOK

CROSS REFERENCE TO RELATED APPLICATION

This application claims the benefit of U.S. Provisional Application Ser. No. 62/500,253, entitled PLURAL FUNCTION AIRPLANE NOSE GEAR TOW HOOK, filed on May 2, 2017, which is incorporated by reference herein.

TECHNICAL FIELD

This disclosure relates to tow hooks for coupling to nose gear of airplanes for moving the front wheels and nose gear of an airplanes such as on to a platform of a tug for moving the airplane from place to place.

SUMMARY

Airplane nose gears come in various types. Some nose gear have a pin or bar for engagement by a tow hook for use in pulling the nose gear forward, such as on to a platform of a tug which then moves the airplane to a desired location. Other airplanes lack a tow hook engaging pin and must be engaged in a different manner for towing purposes.

In accordance with this disclosure, a plural function tow hook is described for engaging airplane nose gears having nose gears of many different styles. Consequently, a single tow hook can be used in multiple applications for aircraft towing purposes.

DETAILED DESCRIPTION

Throughout this disclosure, when a reference is made to a first element being coupled to a second element, the term "coupled" is to be construed to mean both direct connection of the elements as well as indirect connection of the elements by way of one or more additional intervening elements. Also, the singular terms "a", "and", and "first", mean both the singular and the plural unless the term is qualified to expressly indicate that it only refers to a singular element, such as by using the phase "only one". Thus, for example, if two of a particular element are present, there is also "a" or "an" of such element that is present. In addition, the term "and/or" when used in this document is to be construed to include the conjunctive "and", the disjunctive "or", and both "and" and "or". Also, the terms "includes" and "has" have the same meaning as "comprises" and the terms "including" and "having" have the same meaning as "comprising".

Figure 1:
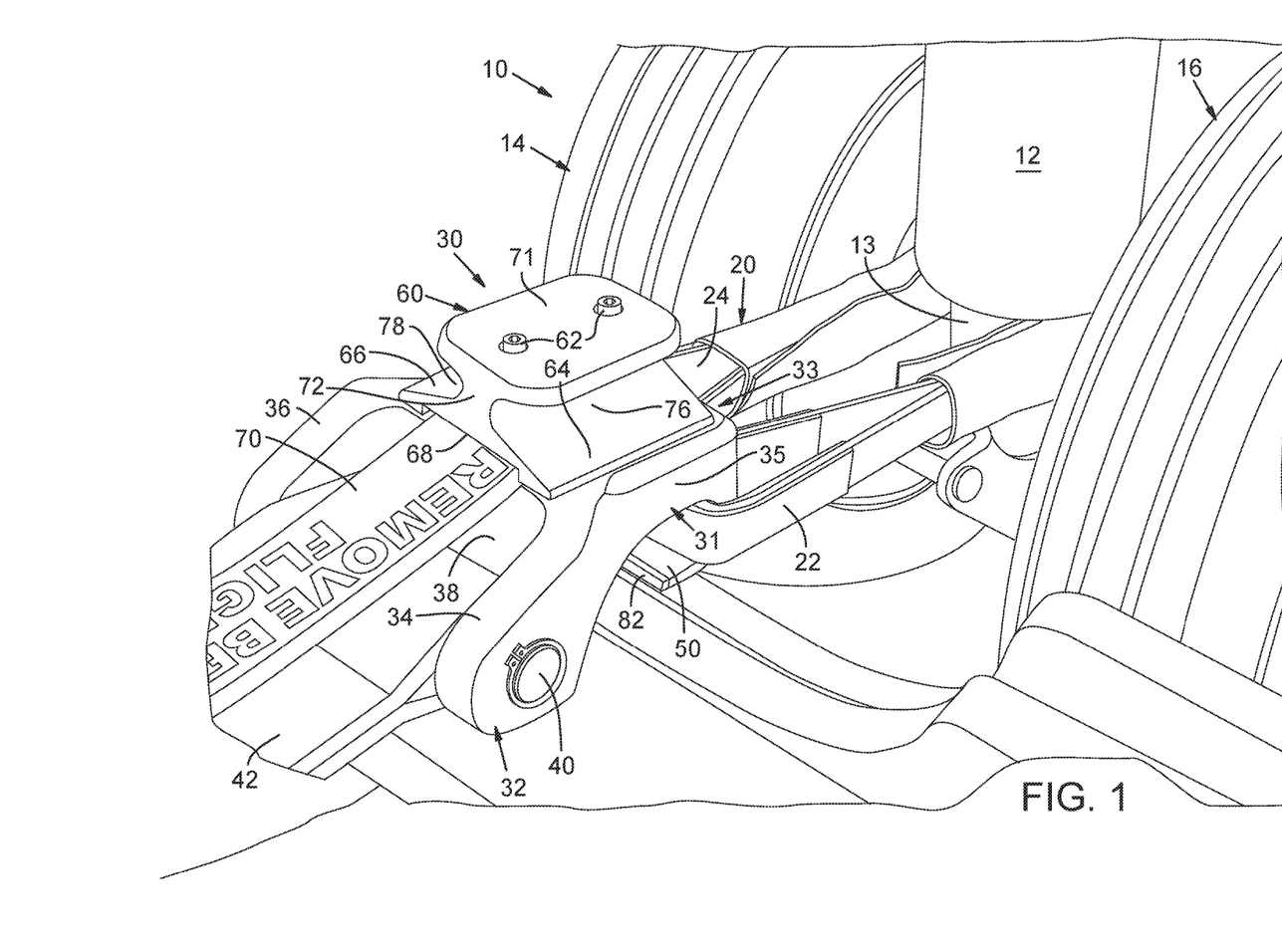
FIG. 1 is a perspective view of a nose gear of an aircraft engaged by a strap coupled to an embodiment of a tow hook in accordance with this disclosure; the tow hook being coupled to the strap which leads to a winch on an airplane tug or other vehicle, not shown.

With reference to FIG. 1, the illustrated nose gear 10 of an exemplary aircraft comprises an upright shock strut 12 and first and second wheels 14, 16 supported by a transversely extending axle (not visible in this figure, but coupled to a lower end 13 of the shock strut).

In this figure, a tow strap 20 is shown wrapped around the lower portion 13 of strut 12. The illustrated tow strap has first and second loops 22, 24.

Figure 2:
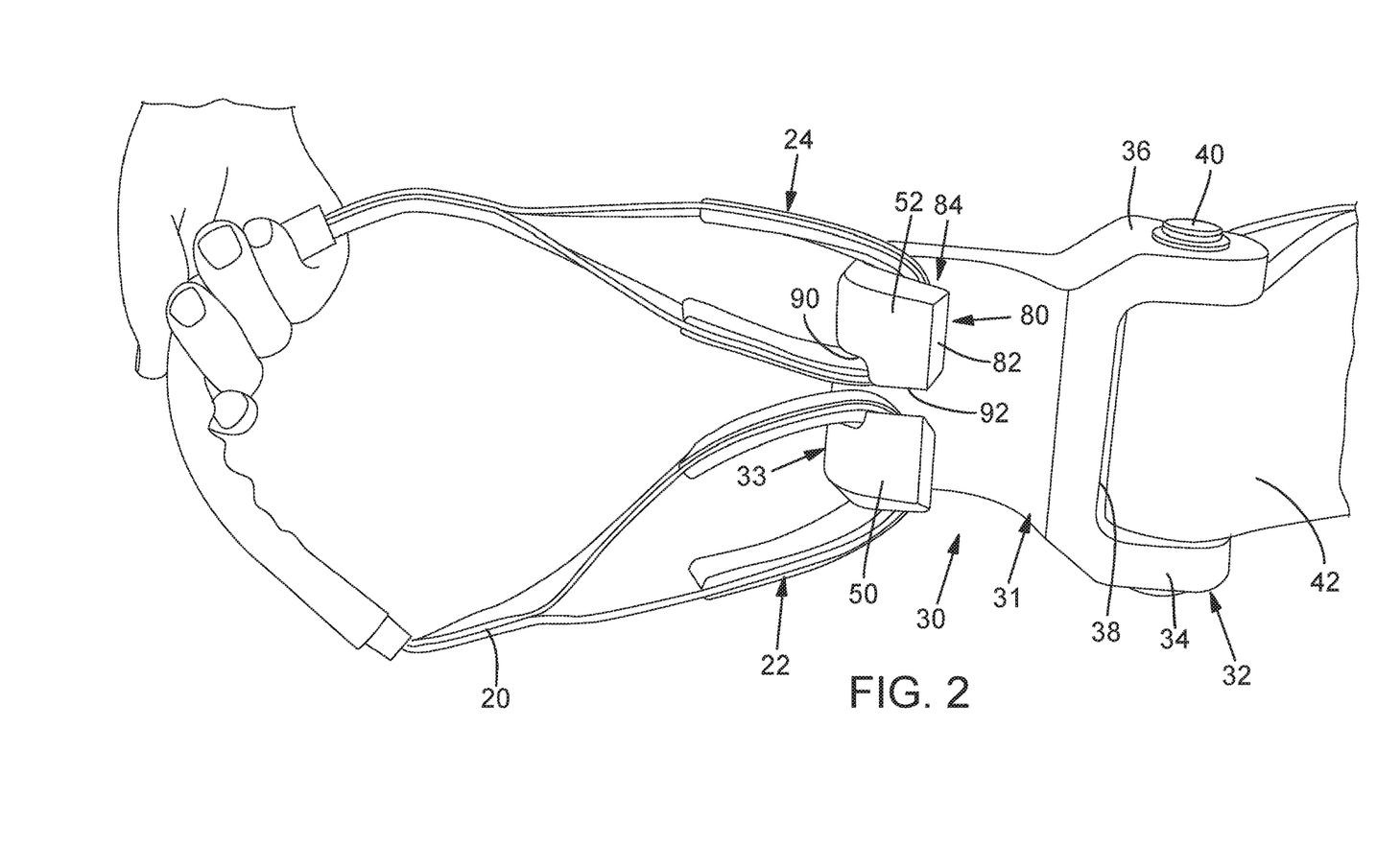
FIG. 2 illustrates the strap engaging dual prongs or hook elements of the tow hook, with one loop of the strap being positioned around a respective first hook element of the tow hook and a second loop of the strap positioned around a second hook element of the tow hook; the airplane nose gear being eliminated in this figure for convenience in illustration.

A tow hook 30 in accordance with one embodiment of this disclosure is shown in FIGS. 1 and 2. The tow hook has a number of ornamental features in addition to the functional features described herein.

The illustrated tow hook comprises a body 31. The body 31 comprises a rear clevis portion 32 and a front hook or claw portion 33. The clevis portion 32 has first and second yoke arms 34, 36 projecting rearward from a main portion 35 of the body 31. The yoke arms 34, 36 are spaced apart and define a strap receiving gap 38 there between. A clevis pin 40 extends between the yoke arms 34, 36. A tow strap 42 is shown wrapped around the pin 40 and interconnected to form a loop to secure the tow strap to the pin between the yoke arms. The tow strap is coupled to a winch on a tug or other aircraft towing vehicle such that the tow strap can be retracted and extended. When retracted, the strap pulls the hook 30 and any aircraft coupled to the hook, forwardly to, for example, place the wheels 14, 16 of the airplane on a nose gear support platform of a tug for towing purposes.

First and second spaced apart towing prongs or hook elements 50, 52 (only element 50 being shown in FIG. 1 with both such elements being shown in FIG. 2) project away from the clevis portion and forwardly from the main body 35 of the tow hook. One of the loops of the tow strap 20 engages one of the hook elements (e.g., loop 22 is shown engaging hook element 50 in FIGS. 1 and 2) and the other of the loops engages the other hook element of the tow hook (e.g., in FIG. 2 hook element 52 is shown engaging loop 24).

As also shown in FIG. 1, a handle portion 60 is shown fastened to the upper surface of the main body 35, such as by fasteners 62, which can comprise bolts threaded into the upper surface of the main body. The handle portion 60 has respective side wings 64, 66 that are supported by and can abut the upper surface of the main body 35 in this embodiment. A recess 68 is provided in the undersurface of cap 60 for receiving a warning panel 70 with warning indicia that is provided to warn operators to remove the tow hook from the aircraft prior to flying the aircraft.

The fasteners 62 can extend through the warning panel to hold the warning panel in place so it does not detach from the assembly.

The handle 60 comprises a top portion 71 connected to the wings 64, 66 by a central region 72. The wings 64, 66, central region 72 and top portion 71 are in this illustrated embodiment of an I-shaped cross section. Thus, the top portion 71 extends outwardly on both sides of the central portion and overhangs the respective wings 64, 66 so that grooves 76, 78 are provided along the sides of the top portion. The illustrated grooves 76, 78 extend longitudinally in the front to back direction along the respective sides of the tow hook 30. These grooves facilitate grasping of the tow hook handle.

With reference to FIG. 2, each of the hook portions can be identical and therefore only hook portion 52 is described below.

Hook portion 52 comprises a proximal end portion 80 and a distal end portion 82. The proximal end portion is coupled to the main body 31 of the tow hook and comprises a projecting portion of the tow hook 30. The distal end 82 is spaced from the proximal end 80 by a gap there between; the gap being indicated at 84 in FIG. 2. The loop 24 fits within the gap 84 when the tow hook is used in towing an aircraft with a tow strap wrapped around a nose gear strut. A notch or recess 90 is provided in an interior side wall 92 of the hook element 52. The notch 90 receives a portion of the loop 24 and assists in preventing the loop from falling free of the tow hook, for example, as it is being wrapped around the strut and also during towing. Various edges of the tow hook body and hook elements can be champhered to minimize the risk of damaging a tow strap.

Figure 3:
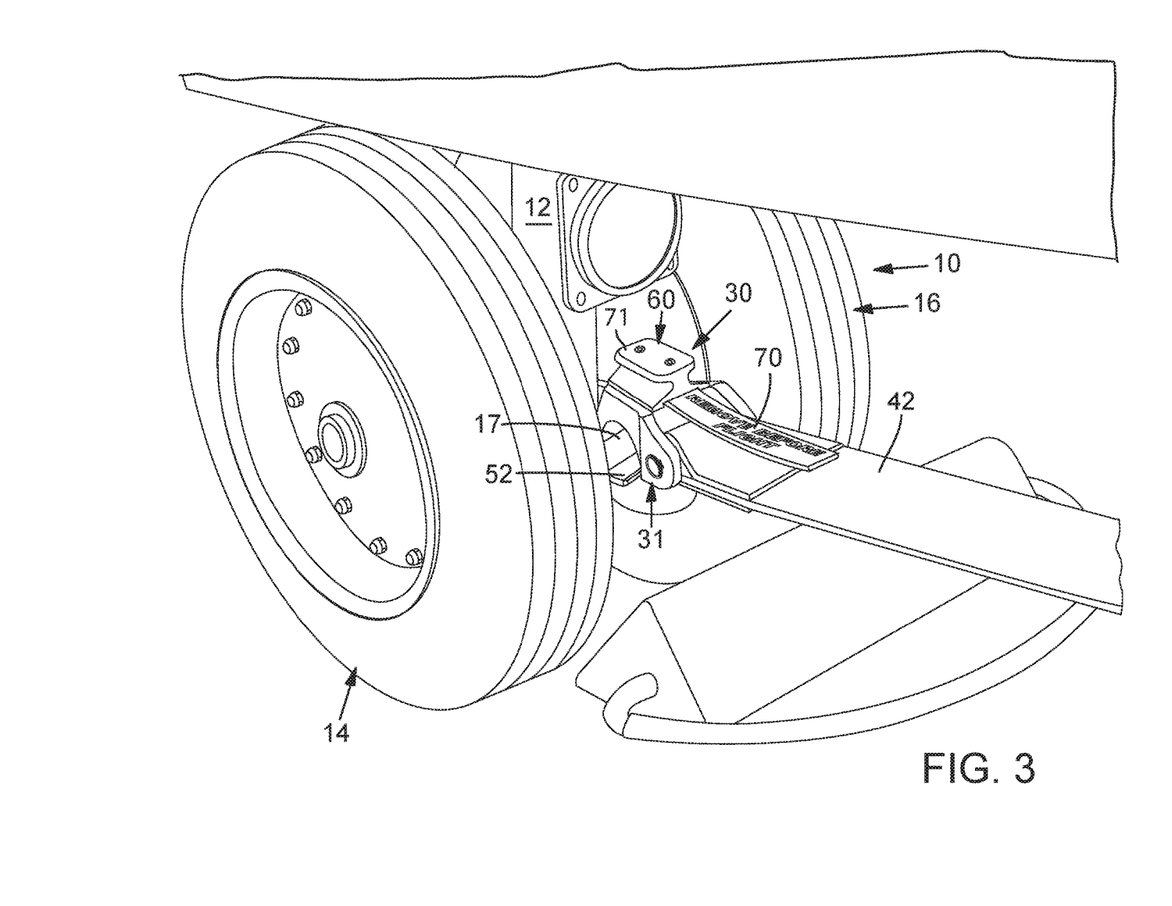
FIG. 3 illustrates an airplane having a nose gear with a pin engaged by the tow hook of FIG. 1.
Figure 4:
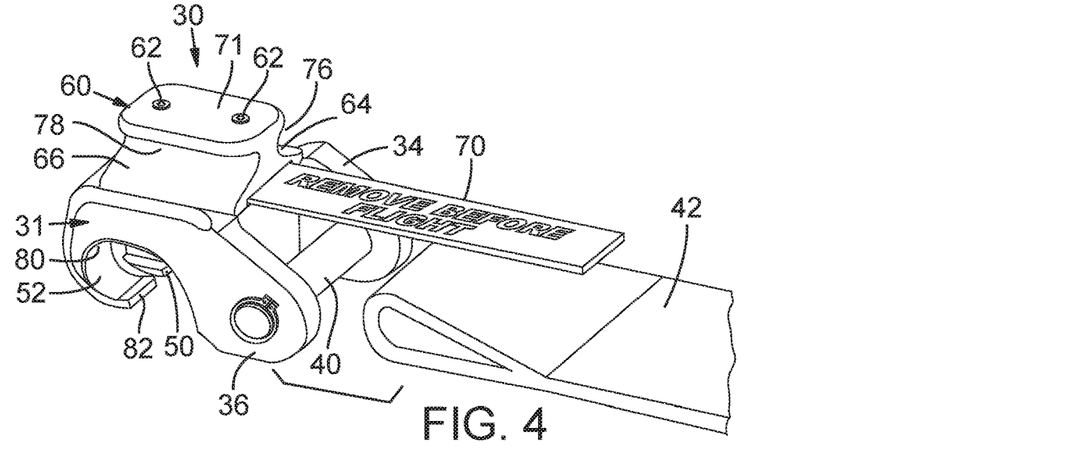
FIG. 4 is a perspective view of the tow hook of FIG. 1 with a winch strap shown disconnected from the tow hook.
Figure 5:
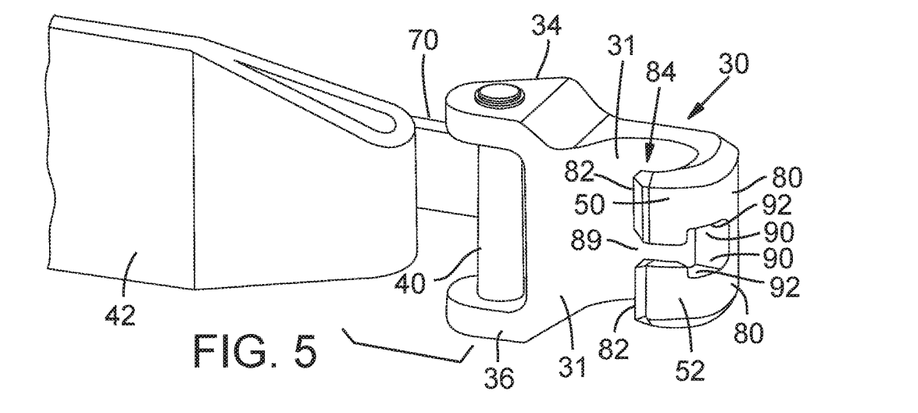
FIG. 5 is a perspective view looking toward the bottom of the tow hook of FIG. 4; again with the winch strap disconnected.

FIG. 3 illustrates the tow hook of FIG. 1 with the hook elements hooked on to a horizontally extending pin 17 without using a strap for coupling the tow hook to the aircraft. In this case, the aircraft nose gear pin is positioned in the gaps of both of the hook elements 50, 52.

FIGS. 4-8 illustrate various views of the tow hook of FIG. 1 with the tow strap 42 shown decoupled from the clevis pin 40 of the tow hook for convenience. These views provide more complete additional illustrations of the tow hook to assist in the understanding of the tow hook.

FIGS. 9-13 illustrate various views of the tow hook of FIG. 1 without the cap piece 71. Although desirable, the cap 71 can be an optional feature of the tow hook.

Figure 6:
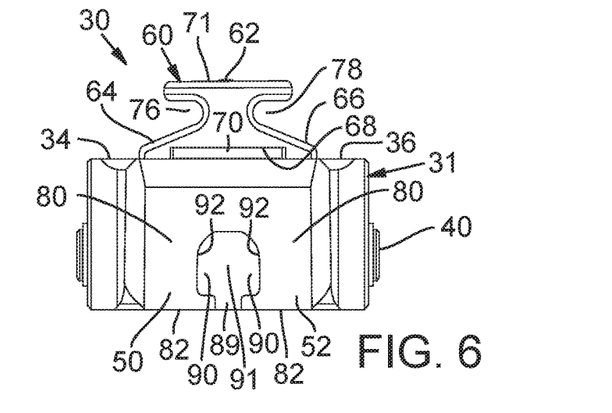
FIG. 6 is a front view of the tow hook of FIG. 4.
Figure 7:
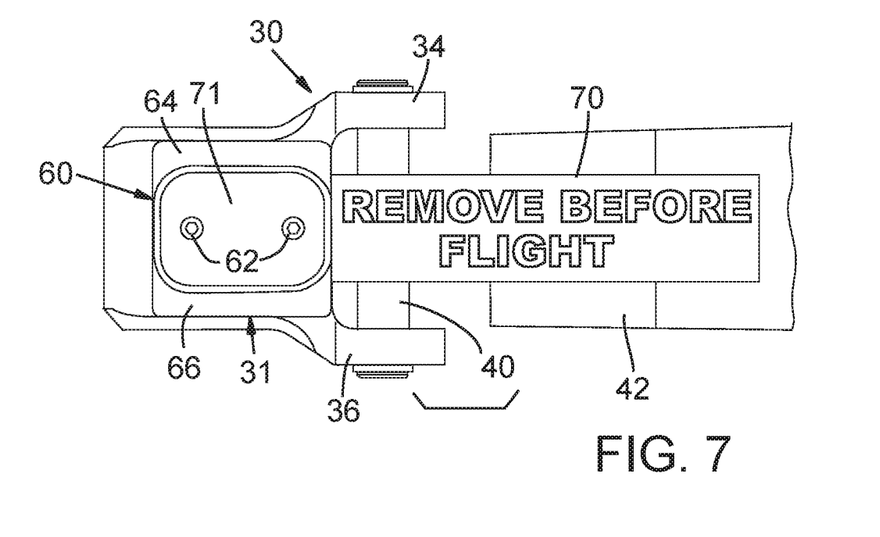
FIG. 7 is a top view of the tow hook of FIG. 4.
Figure 8:
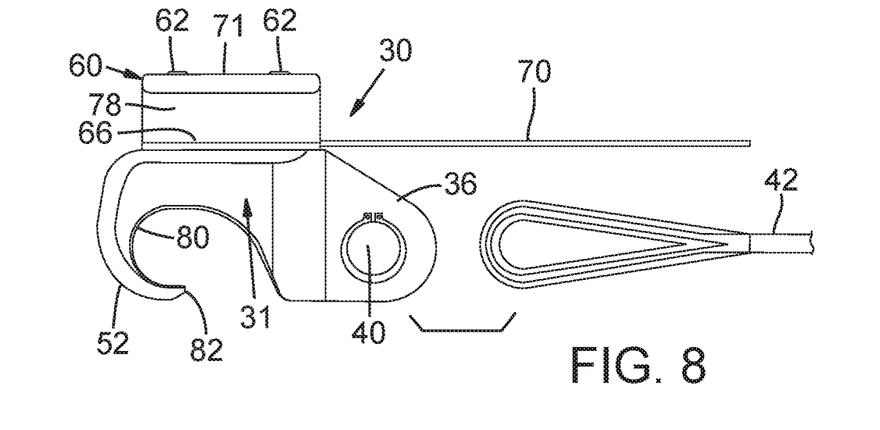
FIG. 8 is a side view of the tow hook of FIG. 4; it being understood that the opposite side view is a mirror image of the view shown in FIG. 8.
Figure 9:
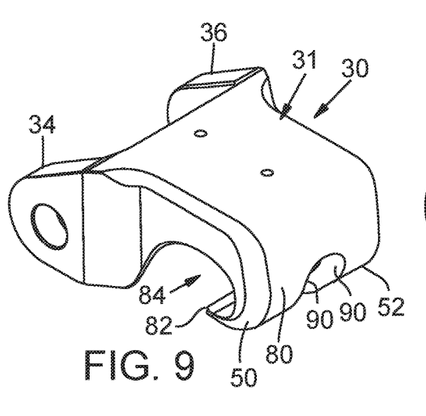
FIG. 9 is a top perspective view of a tow hook in accordance with this disclosure without a top cap portion.
Figure 10:
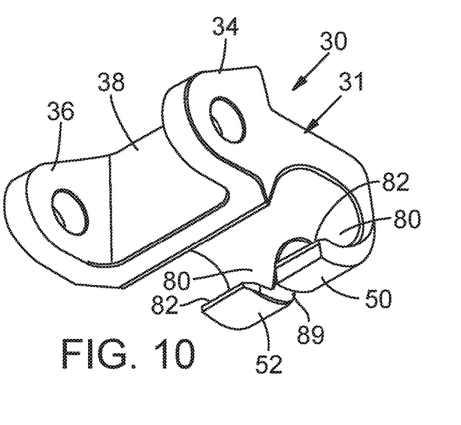
FIG. 10 is a bottom perspective view of the tow hook of FIG. 9.
Figure 11:
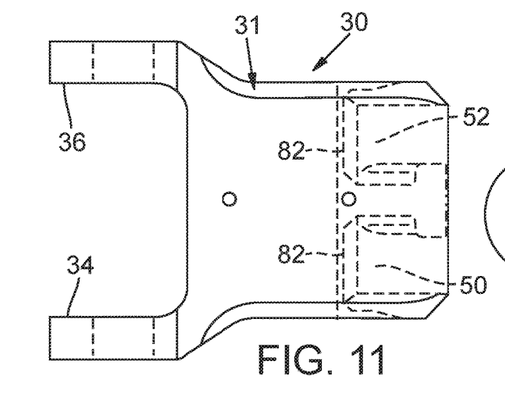
FIG. 11 is a top view of the tow hook of FIG. 9.
Figure 12:
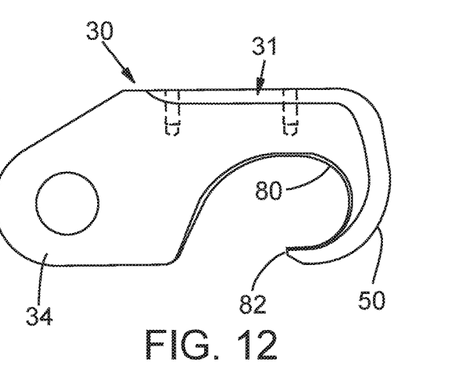
FIG. 12 is a side elevational view of the tow hook of FIG. 9; the opposite side elevational view being a mirror image of the view shown in FIG. 12.
Figure 13:
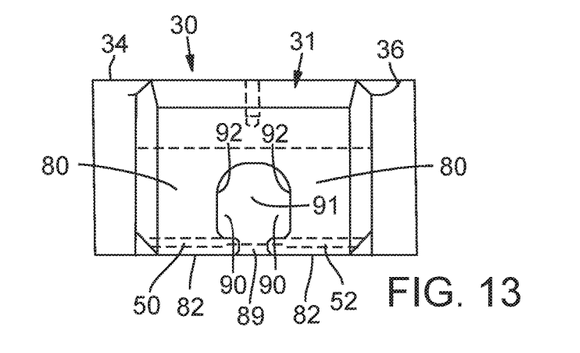
FIG. 13 is a front view of the tow hook of FIG. 9.

Although variable, exemplary dimensions of certain components of the tow hook can be as follows: The radius of the hook elements can be, for example, about three-quarters of an inch. The term "about" encompasses a variation of plus or minus five percent. The width of the main body 31 and of the hook elements can be the same, such as about 2 inches and the gap between the clevis yoke arms 34 and 36 can be this same distance. The height of the tow hook, not including the cap, can be about three inches. The height of the hook elements from the bottom thereof, which can correspond to the plane containing the bottom of the main body 31 can be about 1.5 inches. In addition, the width of the narrowest gap 89 (see for example FIGS. 5, 6 and 13) between the hook elements can be about 0.4 to 0.5 inches. The width of the gap 91 (FIGS. 6 and 13) at the interior indentations of the hook elements can be about 1.2 inches. As can be seen in FIGS. 6 and 13, the gap between the hook elements 50 and 52 can be of a mushroom shape.

Desirably the tow hook is made of aluminum or other strong durable material, such as steel. One specific example is 7705-T6 aluminum. The tow hook can be cast or machined. Desirably, the tow hook is of a one-piece monolithic construction.

The tow hook of this disclosure can be viewed as a universal or plural purpose pawl/strap adaptor.

The illustrated and described principles of these inventive concepts with reference to an embodiment thereof, it should be apparent to those of ordinary skill in the art that this embodiment may be varied in arrangement and detail without departing from the inventive principles disclosed herein. We claim as our invention all inventive features disclosed herein alone and in all possible combinations and sub-combinations thereof.

We claim:

1. An airplane nose gear tow hook comprising:
   a body;
   the body comprising a rear clevis portion and a front claw portion;
   the claw portion comprising first and second hook elements;
   the first hook element comprising a first proximal portion extending downwardly from the body and a rearwardly extending first distal end portion, the first distal end portion having a first distal end, the second hook element comprising a second proximal portion extending downwardly from the body and a rearwardly extending second distal end portion, the second distal end portion having a second distal end, wherein an airplane nose gear pin receiving gap is provided between the first and second distal end portions and the body, and wherein the tow hook is engageable with a nose gear pin of airplane nose gear by passing the nose gear pin into the nose gear pin receiving gap with the first and second hook elements engaging the nose gear pin; and
   wherein a tow strap receiving gap is provided extending from the first and second distal ends between the first and second distal end portions and between the first and second proximal portions, wherein a first portion of a first loop of a tow strap passing around a strut of an airplane nose gear is insertable through the tow strap receiving gap to a location in the tow strap receiving gap between the first and second proximal portions and with the first loop of the tow strap surrounding the first hook element, and wherein a first portion of a second loop of the tow strap passing around the strut of an airplane nose gear is insertable through the tow strap receiving gap to a location in the tow strap receiving gap between the first and second proximal portions and with tow strap surrounding the second hook element; and
   wherein a first portion of the tow strap receiving gap between portions of the first and second proximal portions is wider than a second portion of the tow strap receiving gap spaced further from the body than the first portion of the tow strap receiving gap.

2. An airplane nose gear tow hook according to claim 1 wherein the second portion of the tow strap receiving gap has a width that is greater than the thickness of the tow strap, but less than two times the thickness of the tow strap, and wherein the first portion of the tow strap receiving gap has a width that is greater than two times the thickness of the strap or cable.

3. An airplane nose gear tow hook according to claim 1 wherein the first portion of the tow strap receiving gap has sides bounded entirely by portions of the first and second proximal portions.

4. An airplane nose gear tow hook according to claim 3 wherein the first and second proximal portions have a front surface and wherein at least a portion of the second portion of the tow strap receiving gap extends through the front surface.

5. An airplane nose gear tow hook comprising:
a body;
the body comprising a rear clevis portion and a front claw portion;
the claw portion comprising first and second hook elements;
the first hook element comprising a first proximal portion extending downwardly from the body and a rearwardly extending first distal end portion, the first distal end portion having a first distal end, the second hook element comprising a second proximal portion extending downwardly from the body and a rearwardly extending second distal end portion, the second distal end portion having a second distal end, wherein an airplane nose gear pin receiving gap is provided between the first and second distal end portions and the body, and wherein the tow hook is engageable with a nose gear pin of airplane nose gear by passing the nose gear pin into the nose gear pin receiving gap with the first and second hook elements engaging the nose gear pin;
   wherein a tow strap receiving gap is provided extending from the first and second distal ends between the first and second distal end portions and between the first and second proximal portions, wherein a first portion of a first loop of a tow strap passing around a strut of an airplane nose gear is insertable through the tow strap receiving gap to a location in the tow strap receiving gap between the first and second proximal portions and with the first loop of the tow strap surrounding the first hook element, and wherein a first portion of a second loop of the tow strap passing around the strut of an airplane nose gear is insertable through the tow strap receiving gap to a location in the tow strap receiving gap between the first and second proximal portions and with tow strap surrounding the second hook element; and
   wherein, when looking at the front portion of the body, the visible portions of the tow strap receiving gap have a mushroom shape.

6. An airplane nose gear tow hook comprising:
a body;
the body comprising a rear clevis portion and a front claw portion;
the claw portion comprising first and second hook elements;
the first hook element comprising a first proximal portion extending downwardly from the body and a rearwardly extending first distal end portion, the first distal end portion having a first distal end, the second hook element comprising a second proximal portion extending downwardly from the body and a rearwardly extending second distal end portion, the second distal end portion having a second distal end, wherein an airplane nose gear pin receiving gap is provided between the first and second distal end portions and the body, and wherein the tow hook is engageable with a nose gear pin of airplane nose gear by passing the nose gear pin into the nose gear pin receiving gap with the first and second hook elements engaging the nose gear pin;
   wherein a tow strap receiving gap is provided extending from the first and second distal ends between the first and second distal end portions and between the first and second proximal portions, wherein a first portion of a first loop of a tow strap passing around a strut of an airplane nose gear is insertable through the tow strap receiving gap to a location in the tow strap receiving gap between the first and second proximal portions and with the first loop of the tow strap surrounding the first hook element, and wherein a first portion of a second loop of the tow strap passing around the strut of an airplane nose gear is insertable through the tow strap receiving gap to a location in the tow strap receiving gap between the first and second proximal portions and with tow strap surrounding the second hook element; and
   wherein the first and second proximal portions have first and second surfaces that face one another and that define side portions of the tow strap receiving gap, portions of the first and second surfaces being provided with respective notches facing one another that increase the width of the tow strap receiving gap at the location of the facing notches.

7. An airplane nose gear tow hook comprising:
a body;
the body comprising a rear clevis portion and a front claw portion;
the claw portion comprising first and second hook elements;
the first hook element comprising a first proximal portion extending downwardly from the body and a rearwardly extending first distal end portion, the first distal end portion having a first distal end, the second hook element comprising a second proximal portion extending downwardly from the body and a rearwardly extending second distal end portion, the second distal end portion having a second distal end, wherein an airplane nose gear pin receiving gap is provided between the first and second distal end portions and the body, and wherein the tow hook is engageable with a nose gear pin of airplane nose gear by passing the nose gear pin into the nose gear pin receiving gap with the first and second hook elements engaging the nose gear pin;
   wherein a tow strap receiving gap is provided extending from the first and second distal ends between the first and second distal end portions and between the first and second proximal portions, wherein a first portion of a first loop of a tow strap passing around a strut of an airplane nose gear is insertable through the tow strap receiving gap to a location in the tow strap receiving gap between the first and second proximal portions and with the first loop of the tow strap surrounding the first hook element, and wherein a first portion of a second loop of the tow strap passing around the strut of an airplane nose gear is insertable through the tow strap receiving gap to a location in the tow strap receiving gap between the first and second proximal portions and with tow strap surrounding the second hook element; and
   wherein the body has an upper surface and further comprising a handle coupled to the upper surface of the body.

8. An airplane nose gear tow hook according to claim 7 further comprising a strap with a warning message thereon positioned between the handle and the body.

9. An airplane nose gear tow hook according to claim 8 wherein the handle comprises a strap receiving recess facing the upper surface of the body and wherein the strap with the warning message has an end portion that is positioned in the recess.

10. An airplane nose gear tow hook according to claim 7 wherein the handle is I-shaped.

11. An airplane nose gear tow hook according to claim 7 wherein the handle has first and second side grooves extending in a rear to front direction of the tow hook.

12. An airplane nose gear tow hook comprising:
a body having a front portion and a rear portion, the front portion facing an airplane nose gear when the tow hook engages the airplane nose gear;
first and second yoke arms extending rearwardly from the rear portion of the body;
first and second hook elements at the front portion of the body;
the first hook element comprising a first proximal portion extending downwardly from the front portion of the body and a first distal end portion extending rearwardly from the first proximal portion, the first distal end portion having a first distal end, the second hook element comprising a second proximal portion extending downwardly from the front portion of the body and a second distal end portion extending rearwardly from the second proximal portion, the second distal end portion having a second distal end;
wherein a tow strap receiving gap is provided between the first and second hook elements, the tow strap receiving gap extending from the first and second distal ends, between the first and second distal end portions and between portions of the first and second proximal portions; and
a first notch at the interface of the first proximal portion and the first distal end portion and a second notch at the interface of the second proximal portion and the second distal end portion whereby the tow strap receiving gap is wider between portions of the first and second proximal portions than between the first and second distal end portions.

13. An airplane nose gear tow hook according to claim 12 wherein, when looking at the front portion of the body, the visible portions of the tow strap receiving gap have a mushroom shape.

14. An airplane nose gear tow hook comprising:
a body having a front portion and a rear portion, the front portion facing an airplane nose gear when the tow hook engages the airplane nose gear;
first and second yoke arms extending rearwardly from the rear portion of the body;
first and second hook elements at the front portion of the body;
the first hook element comprising a first proximal portion extending downwardly from the front portion of the body and a first distal end portion extending rearwardly from the first proximal portion, the first distal end portion having a first distal end, the second hook element comprising a second proximal portion extending downwardly from the front portion of the body and a second distal end portion extending rearwardly from the second proximal portion, the second distal end portion having a second distal end, and wherein an airplane nose gear pin receiving gap is provided between the first and second distal end portions and the body;
wherein a tow strap receiving gap is provided between the first and second hook elements, the tow strap receiving gap extending from the first and second distal ends, between the first and second distal end portions and between portions of the first and second proximal portions; and
wherein the first and second proximal portions have first and second surfaces that face one another and that define side portions of a portion of the gap between the first and second proximal portions, the first and second surfaces being provided with respective notches facing one another that increase the width of the tow strap receiving gap at the location of the facing notches.

15. An airplane nose gear tow hook comprising:
a body having a front portion and a rear portion, the front portion facing an airplane nose gear when the tow hook engages the airplane nose gear;
first and second yoke arms extending rearwardly from the rear portion of the body;
first and second hook elements at the front portion of the body;
the first hook element comprising a first proximal portion extending downwardly from the front portion of the body and a first distal end portion extending rearwardly from the first proximal portion, the first distal end portion having a first distal end, the second hook element comprising a second proximal portion extending downwardly from the front portion of the body and a second distal end portion extending rearwardly from the second proximal portion, the second distal end portion having a second distal end, and wherein an airplane nose gear pin receiving gap is provided between the first and second distal end portions and the body;
wherein a tow strap receiving gap is provided between the first and second hook elements, the tow strap receiving gap extending from the first and second distal ends, between the first and second distal end portions and between portions of the first and second proximal portions;
wherein the tow strap receiving gap is widest between portions of the first and second proximal portions; and
wherein the body has an upper surface and further comprising a handle coupled to the upper surface of the body.

16. An airplane nose gear tow hook according to claim 15 wherein the handle comprises a strap receiving recess facing the upper surface of the body and comprising a strap with a warning message having an end portion positioned in the recess.

17. An airplane nose gear tow hook according to claim 15 wherein the handle is I-shaped.

18. An airplane nose gear tow hook comprising:
a body having a front portion and a rear portion, the front portion facing an airplane nose gear when the tow hook engages the airplane nose gear;
first and second yoke arms extending rearwardly from the rear portion of the body;
first and second hook elements at the front portion of the body;
the first hook element comprising a first proximal portion extending downwardly from the front portion of the body and a first distal end portion extending rearwardly from the first proximal portion, the first distal end portion having a first distal end; and wherein an airplane nose gear pin receiving first gap is provided between the distal end portion and the body;

the second hook element comprising a second proximal portion extending downwardly from the front portion of the body and a second distal end portion extending rearwardly from the second proximal portion, the second distal end portion having a second distal end, and wherein an airplane nose gear pin receiving second gap is provided between the distal end portion and the body;

wherein a tow strap receiving gap is provided between the first and second hook elements, the gap extending from the first and second distal ends, between the first and second distal end portions and between portions of the first and second proximal portions;

wherein the tow strap receiving gap is widest between portions of the first and second proximal portions;

wherein the first and second proximal portions have first and second surfaces that face one another and that define side portions of a portion of the tow strap receiving gap between the first and second proximal portions, the first and second surfaces being provided with respective first and second notches facing one another that increase the width of the tow strap receiving gap at the location of the facing notches; and wherein the body has an upper surface and further comprising a handle mounted to the upper surface of the body.

19. A tow hook according to claim 18 coupled to one of a first and second airplane nose gear, when coupled to the first airplane nose gear, a pin of the first airplane nose gear is positioned in the airplane nose gear receiving first and second gaps and engaged by the first and second hook elements, and when coupled to the second airplane nose gear, a first portion of a first loop of a tow strap passes around a strut of the second airplane nose gear and is inserted into the first notch with the first loop of the tow strap surrounding the first hook element, and a first portion of a second loop of the tow strap passing around the strut of the second airplane nose gear is inserted into the second notch with the second loop of the tow strap surrounding the second hook element.

\* \* \* \* \*